United States Patent [19]

Piper

[11] Patent Number: 4,593,678
[45] Date of Patent: Jun. 10, 1986

[54] HOT WATER SUPPLY SYSTEM

[76] Inventor: James R. Piper, 9581 Featherhill Dr., Villa Parke, Calif. 92661

[21] Appl. No.: 289,402

[22] Filed: Aug. 3, 1981

[51] Int. Cl.⁴ .............................................. F24J 2/42
[52] U.S. Cl. .................................. 126/427; 126/417; 126/449; 126/420
[58] Field of Search ............... 126/417, 420, 427, 448, 126/449, 447, 450; 52/171, 200, 398, 764, 788

[56] References Cited

U.S. PATENT DOCUMENTS

| | | | |
|---|---|---|---|
| 3,972,317 | 8/1976 | Gallagher | 126/450 |
| 4,094,301 | 6/1978 | Sorenson et al. | 126/447 |
| 4,196,718 | 4/1980 | Neustein | 126/416 |
| 4,231,204 | 11/1980 | Krueger et al. | 126/450 |
| 4,246,886 | 1/1981 | Sitzlar | 126/427 |
| 4,256,090 | 3/1981 | Imperiale | 126/427 |
| 4,261,329 | 4/1981 | Walsh et al. | 126/417 |

FOREIGN PATENT DOCUMENTS

| | | | |
|---|---|---|---|
| 2611108 | 9/1977 | Fed. Rep. of Germany | 126/450 |
| 2407438 | 6/1979 | France | 126/449 |

Primary Examiner—Samuel Scott
Assistant Examiner—Noah P. Kamen
Attorney, Agent, or Firm—Lyon & Lyon

[57] ABSTRACT

A solar energy system employing solar panels used to heat water. The system includes a boiler with the vent for the boiler being located beneath the solar panels to distribute exhaust heat thereto. A structure is defined to allow venting of the enclosed area behind the panels. The panels are constructed with multiple sheets of plastic as glazing which are retained by means of interlocking elements and adhesive.

6 Claims, 6 Drawing Figures

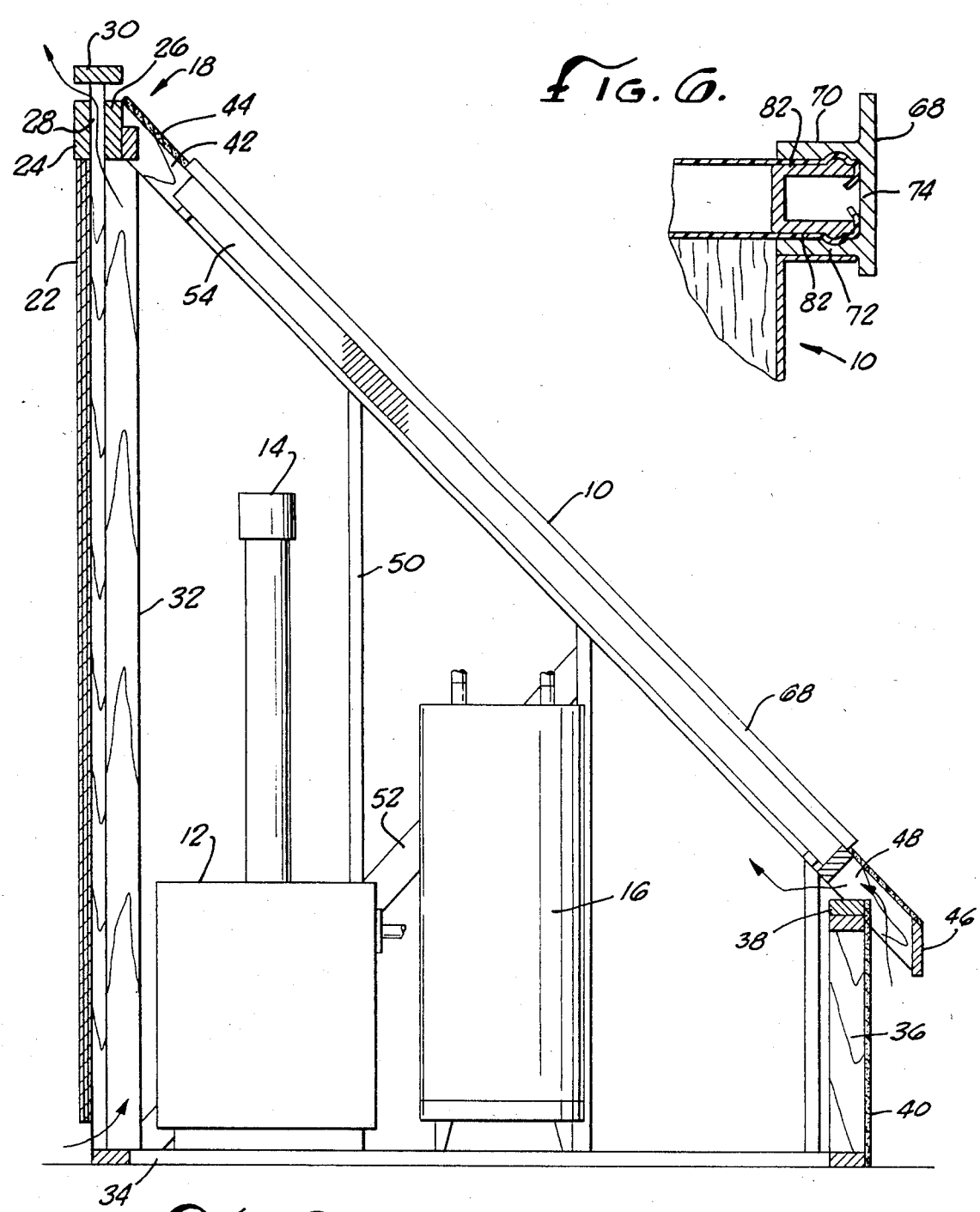
FIG. 6.
FIG. 2.
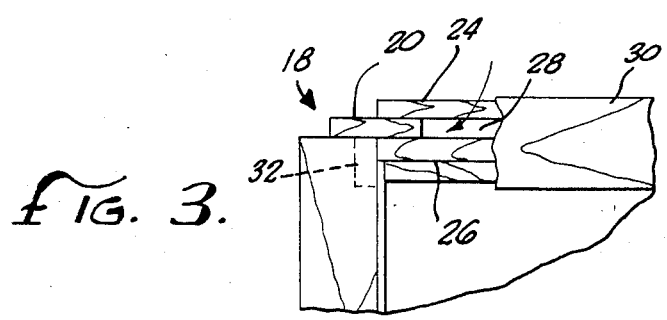
FIG. 3.

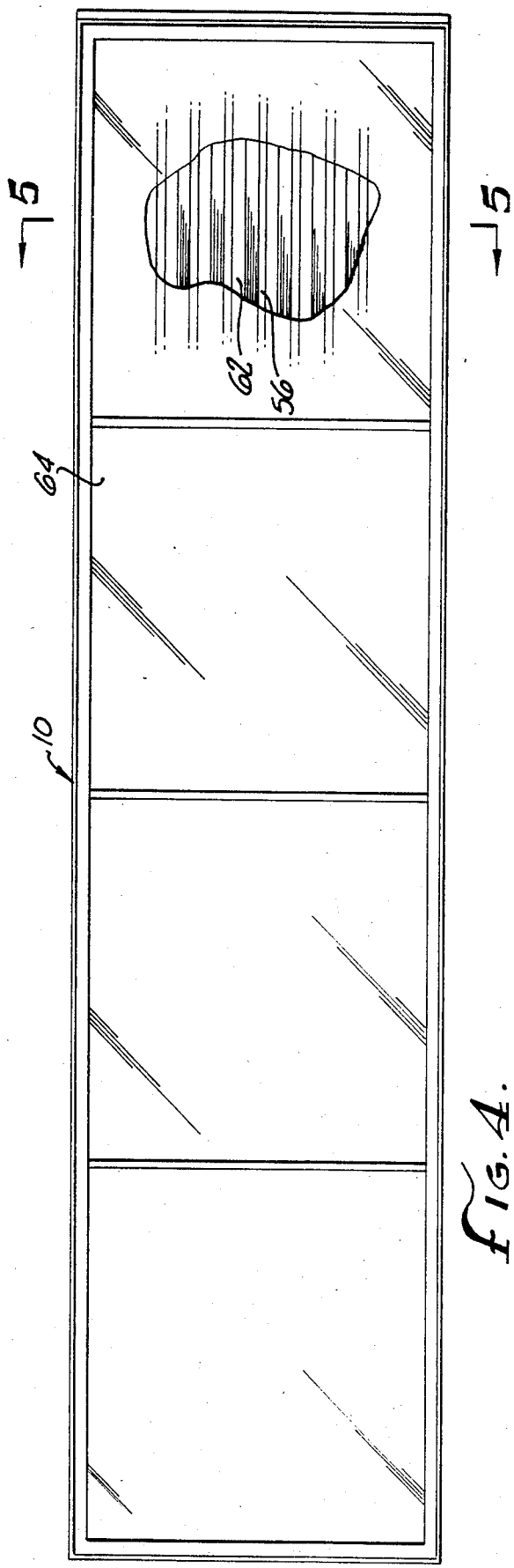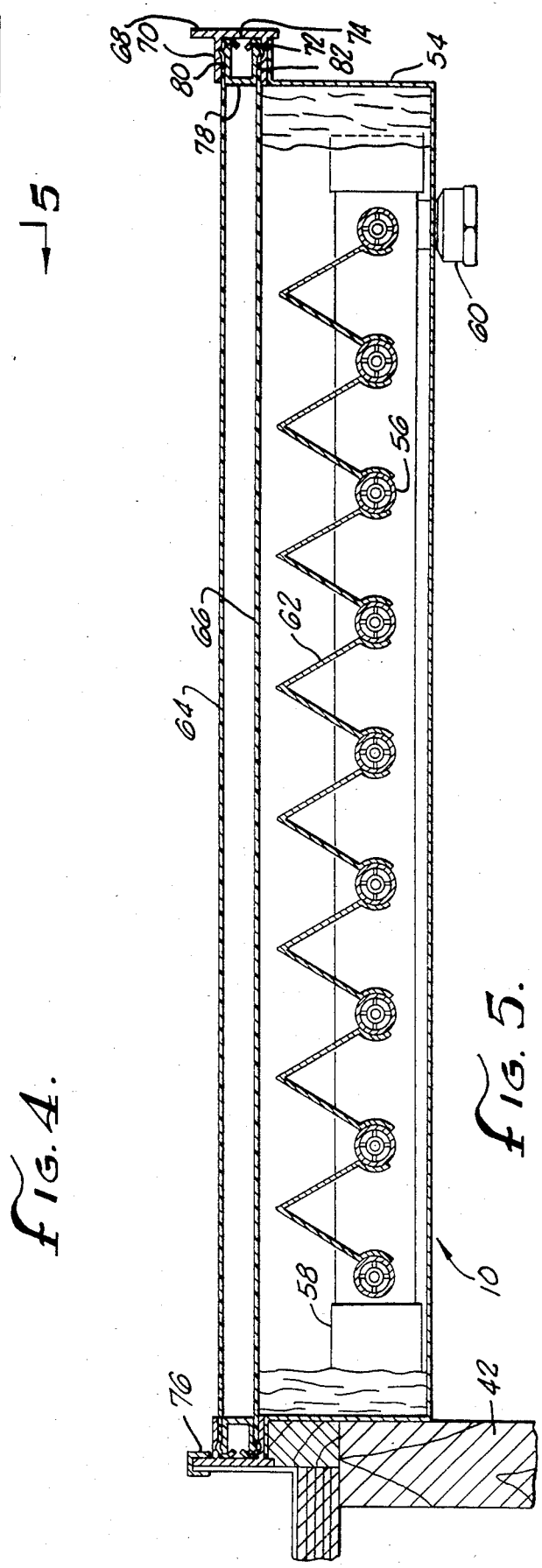

HOT WATER SUPPLY SYSTEM

BACKGROUND OF THE INVENTION

The field of the present invention is hot water supply systems employing solar energy.

With the increasing scarcity of fossil fuels and the particular supply problems experienced over the past years by the United States, a plurality of other forms of energy have gained wide attention. One of the most important areas of new interest is solar energy. Solar energy has been particularly of interest for use in heating buildings and potable water. Often, such solar energy systems incorporate mechanisms for heating water which may then be stored and used as both the source of heat and a source of hot water. Such systems generally include a solar panel or panels having an array of tubes for heating water contained within the tubes. Storage tanks are also employed to save the heat energy thus obtained. Boilers are often commonly employed to augment the solar energy source during times of darkness and inclement conditions.

Certain difficulties have been experienced with solar systems which have inhibited the adoption of such systems. A first problem is initial cost. It remains difficult to justify the initial expense of many solar systems because the lifetime expense of conventional fossil fuel systems remains less. Consequently, a major effort in the solar energy industry has been to improve the efficiency of the solar energy systems to make them more competitive with more conventional heating and water heating systems.

Another difficulty which has been experienced with solar energy systems is in harsh environments where the potential for the water with the solar panel to freeze is substantial. Because the solar panels are designed to pick up as much heat as possible during daytime hours, they are highly susceptible to giving off substantial heat during cold and dark periods. Thus, the relatively exposed tubes filled with water are likely to freeze. One solution has been to drain the panels. However, draining the system is not generally preferred.

Another problem that has been encountered in solar energy systems is that that the designs of the panels for maximum efficiency are at times in conflict with the durability required of such panels which must be exposed much if not all of the time to the environment. One particularly efficient panel design incorporates thin films of plastic material best suited for durability, light transmissivity and heat opacity. This system incorporates two thin films as will be more fully described in the preferred embodiment herein. However, difficulties have been experienced in mounting these films to achieve the proper strength and durability and to meet sealing requirements.

Finally, the advent of new and varied solar energy systems have come into conflict with the building codes in the United States. Building codes have been developed to promote maximum safety and maximum durability of structures. Consequently, the solar energy industry has had to pay particular attention to the myriad codes which exist and conform to these codes which have generally been formulated without much attention to solar energy needs and designs.

SUMMARY OF THE INVENTION

The present invention is directed to a solar energy system for producing heated water. The system is designed to provide maximum efficiency of operation and includes design components directed to solving the problems encountered in the environment in which such systems must function in a manner consistent with the present building codes.

In accomplishing the foregoing, the present invention contemplates as one aspect thereof the advantageous placement of certain components of the solar energy system to accomplish a maximum efficiency. To this end, certain components of the system are placed in a location which may be in a housing or frame over which the solar panels are positioned. The boiler exhaust, the boiler itself and storage tanks and the like may be included in such a frame.

The advantage of such a system is to provide heat to the solar panel from beneath. Such heat would be generated during the colder hours when the continuously used systems are often augmented by such a boiler. A result of the employment of such a system is that the water within the solar panel is heated from the underside by the components and the exhaused gases. The heating of the water in the solar panels adds to the efficiency of the system in that exhausted heat from the boiler is transferred into the water of the system. This arrangement cuts down initial cost by eliminating the need for heavy insulation on the underside of the panel. Finally, the exhaust heat helps maintain the solar panel above freezing when the water within the panel might otherwise freeze and break the pipes or tubes.

The exhausting of heater or boiler gases into a closed frame, albeit efficient, has drawn some concern vis-a-vis building code requirements because of the low level of oxygen contained in the exhaust gases. However, the frame on which the solar panel rests includes the appropriate venting to achieve the required safety dictated by common sense and the building codes. A vent is contemplated at the uppermost part of the enclosure defined by the supporting frame to insure against the entrapment of gases. Other vents may be employed as needed to insure proper air movement for ultimate exhausting of the heater gases.

In a more detailed feature of the present invention, the solar energy system is further protected from the environment by the employment of an appropriate mounting means for the overlying transparent covering on the panels. A system employment interlocking elements with the use of adhesives has been developed to insure proper solar panel strength and maximum solar efficiency.

Accordingly, it is an object of the present invention to provide an improved solar water heating system and components therefor. Other and further objects and advantages will appear hereinafter.

BRIEF DESCRIPTION OF THE DRAWINGS

FIG. 2 is a side view taken along line 2—2 of FIG. 1.

FIG. 3 is a top view detail taken along line 3—3 of FIG. 1.

FIG. 4 is a plan view of a solar panel.

FIG. 5 is a cross-sectional end view taken along line 5—5 of FIG. 4.

FIG. 6 is a detailed cross-section also taken along line 5—5 of FIG. 4.

DETAILED DESCRIPTION OF THE PREFERRED EMBODIMENT

Figure 1:
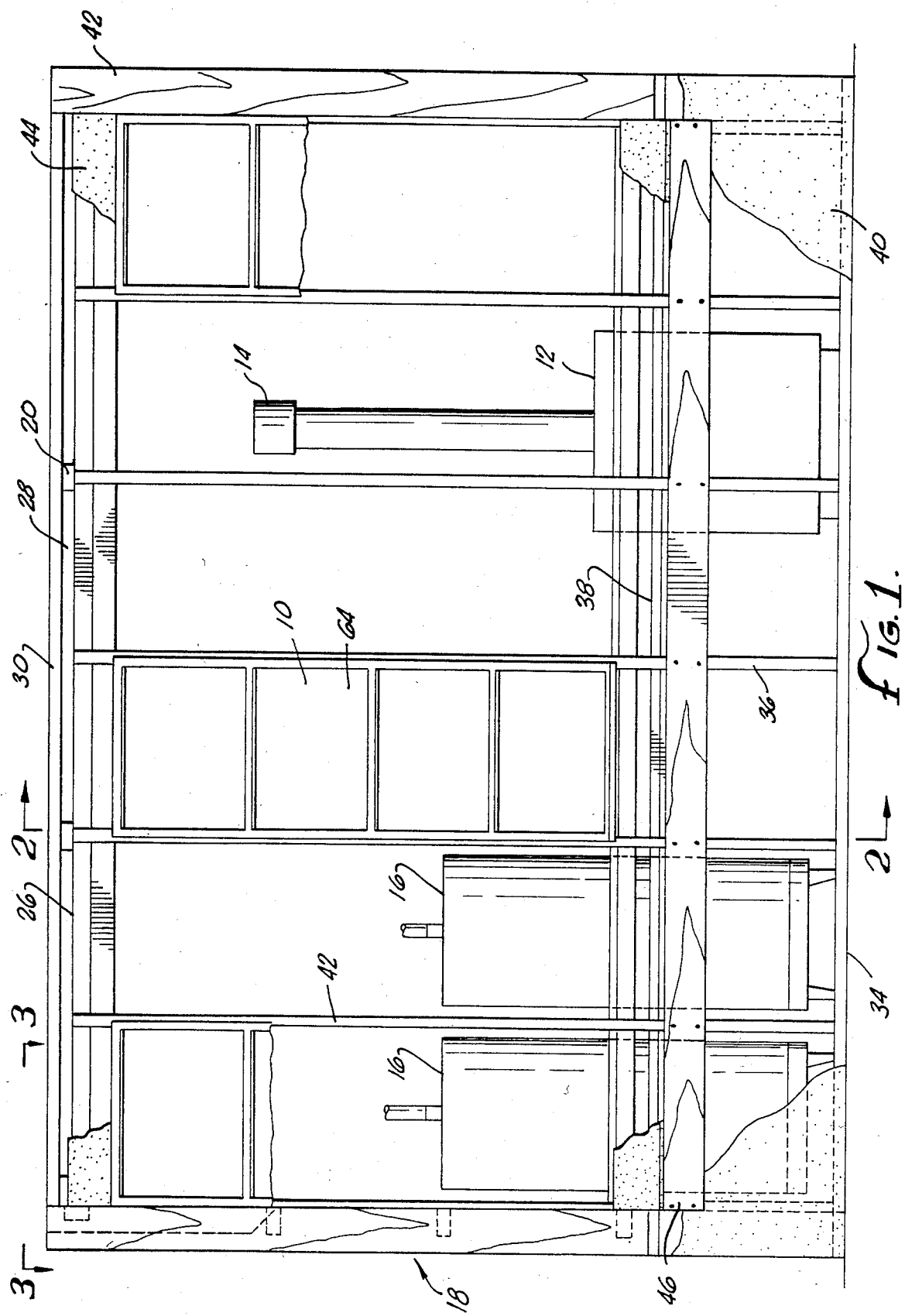
FIG. 1 is a front view of an assembly of the present invention with portions broken away for clarity.

Turning in detail to the drawings, a hot water supply system is illustrated as including solar panels 10, a boiler 12 having an exhaust 14 and storage tanks 16. In this preferred embodiment, the boiler 12, the boiler exhaust 14 and the storage tanks are located within a structure or frame, generally designated 18. The frame 18 is constructed in accordance with generally accepted building practice, including studs, braces and rails of commonly-available lumber. The structure or frame may be a portion of another structure, such as an attic or the like.

A back wall is constructed of studs 20 spaced across the back wall. Plywood panels 22 are then affixed to the studs 20 to enclose the back portion of the frame. At the top of the back wall, two rails 24 and 26 are fixed to either side of the upstanding studs 20. As can be seen, vent passageways 28 are defined between the studs 20 and between the rails 24 and 26. A cap 30 provides an uppermost piece to the back wall and present excessive water and other material from passing into the vent passageways 28. At the bottom of the back wall, the panels 22 may be cut as can best be seen in FIG. 2 to provide a lower vent passageway 30. An outside stud 32 is placed at each end of the back panel to form a surface upon which sheeting may be added to enclose the compartment defined with the frame 18. Base boards 34 are employed to tie together the various portions of the frame 18. These base boards 34 extend from the back wall to the front wall and along either. The front wall is also conventionally constructed with studs 36 capped by a beam 38. Paneling 40 may be employed to finish the closure of the frame 18. The front wall is substantially lower than the back wall because of the inclination of the solar panels. This inclination may vary depending on the latitude of the construction and other factors.

Spanning between the top of the front wall and the top of the back wall are rafters 42 spaced to accommodate the solar panel construction. Paneling 44 may be employed to close off the portions surrounding the solar panel elements. A fascia board covers the end of the rafters 42. A vent 48 may be provided along the front intersection between the plane of the solar panels and the front wall as can best be seen in FIG. 2.

The sides of the frame 18 are also conventionally constructed and include studs 50 and braces 52.

The solar panels 10 are constructed as best illustrated in FIGS. 4 and 5 and are positioned on the frame 18 by positioning on the rafters 42 which are sized to accommodate the panels. In FIG. 5, an end panel is illustrated on rafter 42 to show a convenient means for sealing the panel to the surrounding structure.

Each panel 10 includes a dish-shaped housing 54 having tubes 56 arranged in an array within the housing 54. The tubes extend longitudinally and mutually parallel through substantially the full length of the housing 54 and are coupled at the ends of manifolds 58. The inlet and outlet pipes 60 extend through the bottom of the housing 54. Between the tubes 56 there are heat transfer elements 62 which are generally painted black and more readily convert light energy to heat. This heat is then transferred to the tubes 56 and to the water therein.

To protect the inside of the solar panel and to produce a greenhouse effect to retain heat within the panel, glazing has been generally employed. One such system which has been used and found to be more transparent and more efficient than glass is glazing by two transparent sheets 64 and 66 of plastic. The external glazing is a 0.004 inch sheet of Tedlar, a composition and trademark of DuPont. The inner glazing is a transparent sheet 0.001 to 0.0015 inches in thickness of polytetrafluorethylene. The Tedlar provides a tough and clear outer coating and the PTFE is clear and opaque to heat. These two sheets are drawn taut over the solar panel and retained by a frame according to the present invention.

The frame for the glazing includes a channel 68 positioned about the periphery of the solar panel and above the tubes 56. The channel includes first and second leg members 70 and 72 with a web 74 extending between the leg members 70 and 72 and beyond for fastening to the solar panel and sealing between panels or between a panel and the adjacent surface structure. For sealing, U-shaped channels 76 are employed as can be seen in FIG. 5. The legs of the channel 68 extend from the web inwardly for receipt of an insert 78 which has a first side 80 that is adjacent the upper or first leg member 70 and the second side 82 that is adjacent to the lower or second leg member 72. This arrangement can best be seen in FIG. 6.

Adhesive is placed on the sides 80 and 82 of the sides 80 and 82 of the insert 78 and the glazing sheets 64 and 66 are fixed to the adhesive. The insert is then forced into the channel to a position as shown in FIG. 6. First and second means are located in the respective surfaces for interlocking the insert into the channel. In the present embodiment, these means include ridges on the first and second sides 80 and 82 of the insert 78 and grooves on the insides of the leg members 70 and 72. The physical positioning of the insert 78 into the channel 68 locks the sheets 64 and 66 in place. The adhesive is subject to creep and would not be able to retain tension on the sheets if the sheets were not locked into place. However, the adhesive provides a seal to prevent dirt and moisture from getting into the area between the glazing sheets. Furthermore, the adhesive helps in the assembly of the structure.

With the full assembly in place, the exhaust from the boiler, the boiler lost heat and the lost heat from the storage tanks is absorbed by the back side of the solar panels. In turn, this energy heats the water in the tubes.

To obtain the appropriate vent openings in the compartment for satisfying code requirements and boiler manufacturer specifications, testing of the atmosphere within the compartment is undertaken when the wind is not blowing and the boiler is on. The vent passageway 28 is then restricted by means of plywood or other material being positioned over portions of the vent until the appropriate restriction is achieved. The appropriate restriction retains as much exhaust as possible for heating purposes without reducing the amount of oxygen within the compartment within a dangerous level.

The present system may be employed in an overall system as disclosed in Pipers U.S. patent application Ser. No. 289,403, filed Aug. 3, 1981. The disclosure of this application is incorporated herein by reference.

Thus, an improved hotwater supply system employing solar energy is disclosed. While embodiments and applications of this invention have been shown and described, it would be apparent to those skilled in the art that many more modifications are possible without department from the inventive concepts herein described. The invention, therefore, is not to be restricted except in the spirit of the appended claims.

What is claimed is:

1. A hot water supply system comprising
a boiler having an exhaust;
solar panels; and
a frame supporting said solar panels and including a compartment beneath said solar panels, said boiler exhaust termining in said compartment beneath said solar panels, said boiler being within said compartment.

2. The hot water supply system of claim 1 wherein said frame includes a vent at the top thereof.

3. The hot water supply system of claim 1 further including storage tanks for heated water, said storage tanks being within said compartment beneath said solar panels.

4. A solar panel for a hot water supply system, comprising
a frame;
an array of tubes in said frame;
a channel fixed to said frame about the periphery and above said array of tubes, said channel including said first and second leg members and a web extending therebetween, said leg members extending inwardly from said web toward the center of said array;
an insert in said channel having a first side positioned adjacent one side of said first leg members and a second side positioned adjacent one side of said second leg member;
a first transparent sheet spanning said frame and extending between said first leg member and said first side of said insert;
a second transparent sheet spanning said frame and extending between said second leg member and said second side of said insert;
adhesive between each said first and second sheets and said first and second inserts respectively; and
first means for interlocking said first side of said insert with said first leg member and second means for interlocking said second side of said insert with said second leg member.

5. The solar panel of claim 4 wherein said first and second transparent sheets are tensioned in the planes of said sheets.

6. A hot water supply system comprising
a boiler having an exhaust;
solar panels; and
a frame supporting said solar panels and including a compartment beneath said solar panels, a first vent at the top of said frame and a second vent, said boiler exhaust terminating in said compartment to meet said solar panels and said second vent opens below said exhaust.

* * * * *